A. G. BACHELDER.
Wood Auger.
No. 9,705.
Patented May 10, 1853.
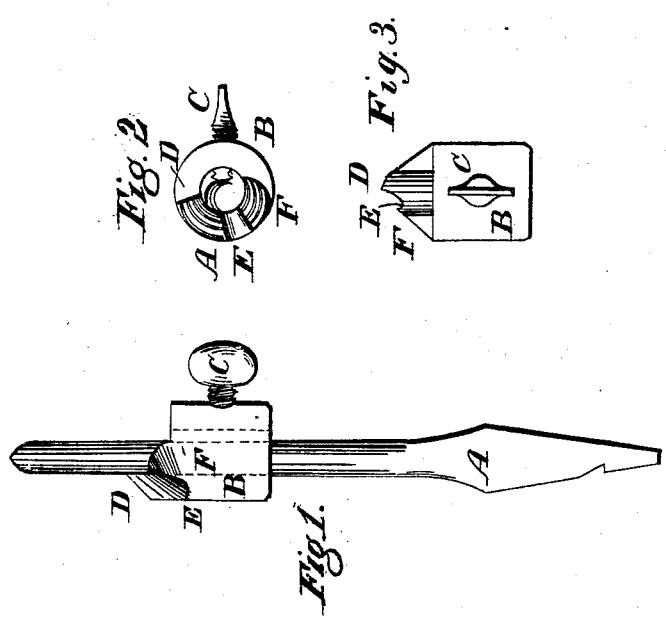

UNITED STATES PATENT OFFICE.

A. G. BACHELDER, OF LOWELL, MASSACHUSETTS.

COUNTERSINK.

Specification of Letters Patent No. 9,705, dated May 10, 1853.

*To all whom it may concern:*

Be it known that I, A. G. BACHELDER, of Lowell, in the county of Middlesex and State of Massachusetts, have invented a new and useful Independent or Adjustable Countersink Adapted to Bits or other Instruments for Boring of Various Sizes; and I do hereby declare that the same is described and represented in the following specification and drawings.

The nature of my invention consists in a collar with a cutting lip on one end which collar is provided with a set screw so as to fasten it in the position desired upon bits or other instruments for boring, so as to countersink or ream the hole when it is bored to the desired depth at one and the same time or operation, thereby saving the time and labor required to change the instruments as it has been necessary to do heretofore.

To enable others skilled in the art to make and use my invention I will proceed to describe its construction and the mode of using it referring to the above mentioned drawings, in which the same letters indicate like parts in each of the figures.

Figure 1, represents a bit with the countersink attached to it ready for use; and Fig. 2, is a representation of the same looking at the point of the bit. Fig. 3, represents the countersink turned one fourth the way around from the position represented in Fig. 1.

A is a common pad bit; B the countersink fastened upon it by the set screw C; the hole in the countersink is larger than the diameter of the bit as represented by the dotted lines in Fig. 1, and the lip or cutting edge D of the countersink is upon the opposite side of the hole from the screw and should be set to correspond with the cutting edge of the bit as represented in Figs. 1, and 2, and also set at such a distance from the point of the bit, that it will gage the depth of the hole at the same time that it cuts the countersink.

The cutting lip D of the countersink is supported by about one fourth of the collar receding gradually from the cutting edge; directly in front of which edge there is a circular score E and on the opposite side of the score from the lip is the gage projection F, which may be made to govern the thickness of the chip cut by the lip D, which lip may be sharpened by grinding when it becomes dull, and the gage may be ground off to correspond with the lip.

It is apparent from the above description that this countersink can be used upon bits of various sizes, from the diameter of the hole to a little more than one half of said diameter, and also that it may be set so as to countersink the hole when bored to the depth required, also by reversing it upon the bit it will serve to gage the depth of the hole without countersinking it.

I contemplate that various modifications of my countersink may be made, such as would readily suggest themselves to mechanics. Also that a lip and gage piece may be made upon each end, and the angles of both lips may be the same or different, the countersinks being made of such sizes as will answer the purpose intended.

What I claim as my invention and desire to secure by Letters Patent is—

An independent countersink so constructed that it may be used on different sized bits or other instruments for boring, for the purpose of countersinking as well as gaging the depth of the hole at the same time it is bored substantially as described.

ASAHEL G. BACHELDER.

Witnesses:
    WILLIAM A. RICHARDSON,
    BENJ. ADAMS.